US007564803B1

(12) United States Patent
Minei et al.

(10) Patent No.: US 7,564,803 B1
(45) Date of Patent: Jul. 21, 2009

(54) POINT TO MULTI-POINT LABEL SWITCHED PATHS WITH LABEL DISTRIBUTION PROTOCOL

(75) Inventors: Ina Minei, Santa Clara, CA (US); Kireeti Kompella, Los Altos, CA (US); Nischal Sheth, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 559 days.

(21) Appl. No.: 11/215,813

(22) Filed: Aug. 29, 2005

(51) Int. Cl.
*H04L 12/28* (2006.01)
*H04L 12/56* (2006.01)
(52) U.S. Cl. .................. 370/254; 370/390; 370/401
(58) Field of Classification Search ......... 370/252–254, 370/389, 390, 392, 400, 401, 432
See application file for complete search history.

(56) References Cited

U.S. PATENT DOCUMENTS

| | | | |
|---|---|---|---|
| 5,600,642 A | 2/1997 | Pauwels et al. | |
| 6,374,303 B1* | 4/2002 | Armitage et al. | 709/242 |
| 6,477,166 B1 | 11/2002 | Sanzi et al. | |
| 6,493,349 B1 | 12/2002 | Casey | |
| 6,501,754 B1* | 12/2002 | Ohba et al. | 370/389 |
| 6,553,028 B1 | 4/2003 | Tang et al. | |
| 6,731,652 B2 | 5/2004 | Ramfelt et al. | |
| 6,751,218 B1 | 6/2004 | Hagirahim et al. | |
| 6,778,531 B1 | 8/2004 | Kodialam et al. | |
| 6,807,182 B1 | 10/2004 | Dolphin et al. | |
| 6,879,594 B1* | 4/2005 | Lee et al. | 370/408 |
| 6,920,503 B1 | 7/2005 | Nanji et al. | |
| 7,035,226 B2* | 4/2006 | Enoki et al. | 370/254 |
| 7,039,687 B1 | 5/2006 | Jamieson et al. | |
| 7,082,102 B1* | 7/2006 | Wright | 370/229 |
| 7,133,928 B2 | 11/2006 | McCanne | |

(Continued)

FOREIGN PATENT DOCUMENTS

KR    2004001206    1/2004

(Continued)

OTHER PUBLICATIONS

Aggarwal et al., "Establishing Point to Multipoint MPLS TE LSPs," submitted to Internet Engineering Task Force (IETF) Feb. 11, 2007, pp. 1-15.

(Continued)

*Primary Examiner*—Hong Cho
(74) *Attorney, Agent, or Firm*—Shumaker & Sieffert, P.A.

(57) ABSTRACT

The label distribution protocol (LDP) is extended to set up a point to multi-point (P2MP) label switched path (LSP) across a computer network from a source network device to one or more destination network devices. LDP is extended to create a P2MP label map message containing a label and a P2MP forwarding equivalence class (FEC) element having a root node address and an identifier. The P2MP FEC element may, for example, associate an address of the root node of the P2MP LSP with an opaque identifier. The P2MP FEC element uniquely identifies the P2MP LSP. The P2MP FEC element may be advertised with a label in a P2MP label map message. A source network device or the destination network devices may initiate setup and teardown of the P2MP LSP. The P2MP label map messages may be propagated from the destination network devices to the source network device.

13 Claims, 6 Drawing Sheets

U.S. PATENT DOCUMENTS

| | | | |
|---|---|---|---|
| 7,251,218 | B2 | 7/2007 | Jorgensen |
| 7,269,135 | B2 | 9/2007 | Frick et al. |
| 7,281,058 | B1 | 10/2007 | Shepherd et al. |
| 7,330,468 | B1 | 2/2008 | Tse-Au |
| 7,333,491 | B2 | 2/2008 | Chen et al. |
| 7,359,328 | B1 * | 4/2008 | Allan .................. 370/236.2 |
| 2002/0071390 | A1 * | 6/2002 | Reeves et al. ............. 370/235 |
| 2002/0118644 | A1 | 8/2002 | Moir |
| 2002/0181477 | A1 | 12/2002 | Mo et al. |
| 2002/0191584 | A1 | 12/2002 | Korus et al. |
| 2003/0012215 | A1 | 1/2003 | Novaes |
| 2003/0021282 | A1 | 1/2003 | Hospodor |
| 2003/0031175 | A1 | 2/2003 | Hayashi et al. |
| 2003/0043772 | A1 | 3/2003 | Mathis et al. |
| 2003/0088696 | A1 | 5/2003 | McCanne |
| 2003/0099235 | A1 | 5/2003 | Shin et al. |
| 2003/0112748 | A1 | 6/2003 | Puppa et al. |
| 2003/0123446 | A1 | 7/2003 | Muirhead et al. |
| 2003/0177221 | A1 | 9/2003 | Ould-Brahim et al. |
| 2003/0191937 | A1 | 10/2003 | Balissat et al. |
| 2004/0037279 | A1 | 2/2004 | Zelig et al. |
| 2004/0047342 | A1 | 3/2004 | Gavish et al. |
| 2004/0081154 | A1 | 4/2004 | Kouvelas |
| 2004/0151181 | A1 | 8/2004 | Chu et al. |
| 2004/0190517 | A1 | 9/2004 | Gupta et al. |
| 2004/0218536 | A1 | 11/2004 | Yasukawa et al. |
| 2005/0018693 | A1 | 1/2005 | Dull |
| 2005/0027782 | A1 | 2/2005 | Jalan et al. |
| 2005/0097203 | A1 | 5/2005 | Unbehagen et al. |
| 2005/0108419 | A1 | 5/2005 | Eubanks |
| 2005/0111351 | A1 | 5/2005 | Shen |
| 2005/0169270 | A1 | 8/2005 | Mutou et al. |
| 2005/0232193 | A1 | 10/2005 | Jorgensen |
| 2005/0262232 | A1 | 11/2005 | Cuervo et al. |
| 2005/0281192 | A1 | 12/2005 | Nadeau et al. |
| 2006/0013141 | A1 * | 1/2006 | Mutoh et al. ................ 370/241 |
| 2006/0039364 | A1 * | 2/2006 | Wright .................. 370/352 |
| 2006/0047851 | A1 | 3/2006 | Voit et al. |
| 2006/0147204 | A1 | 7/2006 | Yasukawa et al. |
| 2006/0153067 | A1 | 7/2006 | Vasseur et al. |
| 2006/0182034 | A1 | 8/2006 | Klinker et al. |
| 2006/0221958 | A1 * | 10/2006 | Wijnands et al. ............ 370/389 |
| 2007/0036162 | A1 | 2/2007 | Tingle et al. |
| 2007/0098003 | A1 | 5/2007 | Boers et al. |
| 2007/0140107 | A1 | 6/2007 | Eckert et al. |
| 2008/0123654 | A1 | 5/2008 | Tse-Au |

FOREIGN PATENT DOCUMENTS

| | | |
|---|---|---|
| WO | WO 02/091670 A2 | 11/2002 |
| WO | WO 2004/071032 A1 | 8/2004 |

OTHER PUBLICATIONS

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2 pgs, printed Apr. 18, 2005. http://www.javvin.com/protocolRSVPTE.html.

U.S. Appl. No. 11/056,383, entitled "Fast Reroute Of Traffic Associated With A Point To Multi-Point Network Tunnel," filed Feb. 10, 2005.

U.S. Appl. No. 11/192,432, entitled "Transmission of Layer Two (L2) Multicast Traffic Over Multi-Protocol Label Switching Networks," filed Jul. 28, 2005.

U.S. Appl. No. 11/212,509, entitled "Aggregate Multicast Trees For Multicast Virtual Private Networks," filed Aug. 26, 2005.

U.S. Appl. No. 11/212,500, entitled "Multicast Data Trees For Multicast Virtual Private Networks," filed Aug. 26, 2005.

U.S. Appl. No. 11/212,507, entitled "Reliable Exchange Of Control Information For Multicast Virtual Private Networks," filed Aug. 26, 2005.

U.S. Appl. No. 11/213,636, entitled "Transport Of Control And Data Traffic For Multicast Virtual Private Networks," filed Aug. 26, 2005.

U.S. Appl. No. 11/213,638, entitled "Shared Multicast Trees For Multicast Virtual Private Networks," filed Aug. 26, 2005.

U.S. Appl. No. 11/212,475, entitled "Label Switching Multicast Trees For Multicast Virtual Private Networks," filed Aug. 26, 2005.

U.S. Appl. No. 11/212,932, entitled "Multicast Trees For Virtual Private Local Area Network (LAN) Service Multicast," filed Aug. 26, 2005.

U.S. Appl. No. 11/213,637, entitled "Aggregate Multicast Trees For Virtual Private Local Area Network (LAN) Service Multicast," filed Aug. 26, 2005.

U.S. Appl. No. 11/212,490, entitled "Multicast Data Trees For Virtual Private Local Area Network (LAN) Service Multicast," filed Aug. 26, 2005.

U.S. Appl. No. 11/213,639, entitled "Exchange of Control Information For Virtual Private Local Area Network (LAN) Service Multicast," filed Aug. 26, 2005.

U.S. Appl. No. 11/213,640, entitled "Auto-Discovery Of Multicast Virtual Private Networks," filed Aug. 26, 2005.

U.S. Appl. No. 11/213,641, entitled "Inter-Autonomous System (AS) Multicast Virtual Private Networks," filed Aug. 26, 2005.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

K. Kompella et al., "Virtual Private LAN Service," draft-ietf-l2vpn-vpls-bgp-00.txt, May 2003, 22 pgs.

Y. Rekhter et al., "A Border Gateway Protocol 4 (BGP-4)," Mar. 1995, 72 pgs.

L. Martini et al., "Transport of Layer 2 Frames Over MPLS," Network Working Group Internet Draft, draft-martini-l2circuit-trans-mpls-08.txt, Nov. 2001, 18 pgs.

L. Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

* cited by examiner

POINT TO MULTI-POINT LABEL SWITCHED PATHS WITH LABEL DISTRIBUTION PROTOCOL

TECHNICAL FIELD

The invention relates to computer networks and, more particularly, to transmission of multicast traffic within a computer network.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Routing devices within the network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocols, such as the Interior Gateway Protocol (IGP).

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing point-to-point LSPs across a network. For example, one such protocol is the label distribution protocol (LDP). Label switching routers (LSRs) in an MPLS network may use LDP to inform other LSRs of their label assignments. Another protocol is a resource reservation protocol, such as the Resource Reservation Protocol with Traffic Engineering extensions (RSVP-TE).

A service provider may provide multicast services to virtual private network (VPN) customers by setting up point to multi-point (P2MP) LSPs across the service provider network. The service provider may set up P2MP LSPs using RSVP. However, many VPN networks already use LDP, and deploying a second label distribution protocol to set up P2MP LSPs may be impractical. Additionally, RSVP has difficulty scaling in service provider networks that include a large number of provider edge routers.

SUMMARY

In general, the invention is directed to techniques for establishing a point to multi-point (P2MP) tunnel from a source network device to one or more destination devices. In particular, the techniques provide for extension of a protocol such as the label distribution protocol (LDP) to allow LDP to set up a P2MP label switched path (LSP) from the source device to each of the destination devices.

In accordance with the principles of the invention, LDP has been extended to create a P2MP label map message containing a label and a P2MP forwarding equivalence class (FEC) element having a root node address and an identifier. The P2MP FEC element may, for example, associate an address of the root node of the P2MP LSP with an opaque identifier. The P2MP FEC element uniquely identifies the P2MP LSP. The P2MP FEC element may be advertised with a label in a P2MP label map message.

The destination network devices initiate the setup and teardown of the P2MP LSP, and P2MP label map messages are propagated from the destination network devices to the source network device. The source network device installs a forwarding state to map traffic into the P2MP LSP for transmission of multicast traffic across the network. An intermediate network device receives a packet from the P2MP LSP and outputs two or more copies of the packet when two or more branches of the P2MP LSP originate at the intermediate device.

In one embodiment, a method comprises defining a FEC element for a label distribution protocol that identifies a P2MP LSP, generating a message that specifies the P2MP LSP using the defined FEC element, and communicating the message in accordance with the label distribution protocol to a routing device.

In another embodiment, a method comprises receiving a first request for a label associated with a first P2MP LSP, allocating a label for the first P2MP LSP, receiving a second request for a label associated with a second P2MP LSP, and allocating the same label for the second P2MP LSP when one or more destination devices associated with the second P2MP LSP are the same as one or more destination devices associated with the first P2MP LSP.

In another embodiment, a network device comprises a control unit that generates a message having a FEC element that specifies a P2MP LSP and communicates the message in accordance with a label distribution protocol to a routing device.

In a further embodiment, a system comprises a source device, one or more destination devices, and a P2MP LSP that connects the source device to the one or more destination devices in accordance with a label distribution protocol, wherein the label distribution protocol defines a FEC element for identifying the P2MP LSP.

In another embodiment, a system comprises a first source device, a second source device, an intermediate device, one or more destination devices, a first P2MP LSP that connects the first source device to the intermediate device and the one or more destination devices, and a second P2MP LSP that connects the second source device to the intermediate device and the one or more destination devices. The intermediate device allocates the same label for the second P2MP LSP when one or more destination devices associated with the second P2MP LSP are the same as one or more destination devices associated with the first P2MP LSP.

In a further embodiment, a computer-readable medium comprises instructions for causing a programmable processor to define a FEC element for a label distribution protocol that identifies a P2MP LSP, generate a message that specifies the P2MP LSP using the defined FEC element, and communicate the message in accordance with the label distribution protocol to a routing device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
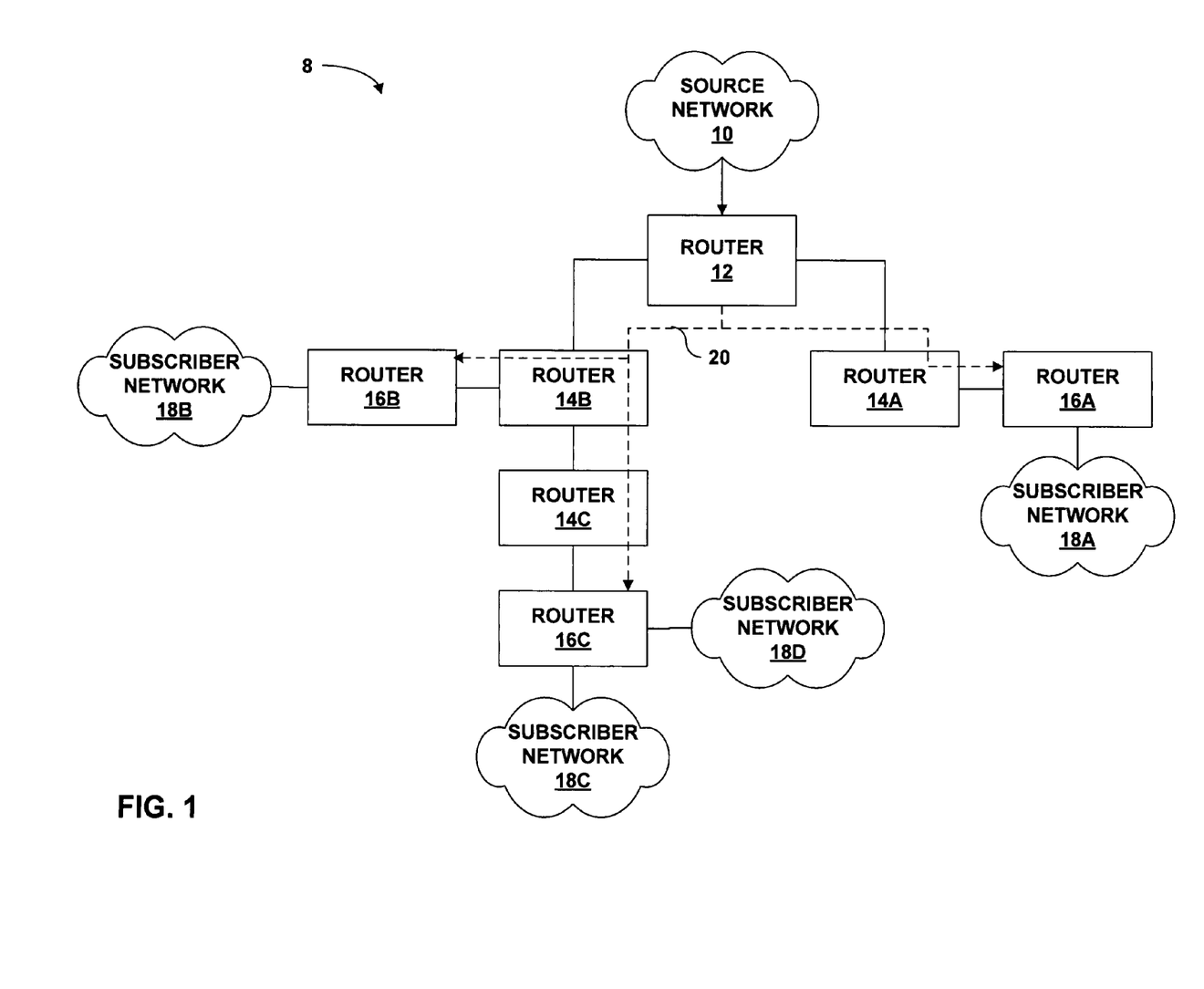
FIG. 1 is a block diagram illustrating an exemplary computer network having a point to multi-point (P2MP) label switch path (LSP).

FIG. 1 is a block diagram illustrating an exemplary computer network 8 having a point to multi-point (P2MP) label switched path (LSP). Computer network 8 utilizes a protocol that has been extended to allow the protocol to establish the P2MP LSP. In this example, network 8 includes a P2MP LSP 20 established between a source router 12 (also referred to as a source network device) and destination routers 16A-16C ("routers 16") (also referred to as destination network devices). In the example of FIG. 1, router 12 uses a protocol such as the label distribution protocol (LDP) that has been extended to establish P2MP LSP 20 to carry traffic between source network 10 and subscriber networks 18.

Source network 10 may comprise any public or private network or the Internet. As shown in FIG. 1, system 10 includes subscriber networks 18. Subscriber networks 18 may include local area networks (LANs) or wide area networks (WANs) that comprise a plurality of subscriber devices. The subscriber devices may include personal computers, laptops, workstations, personal digital assistants (PDAs), wireless devices, network-ready appliances, filer servers, print servers or other devices that access source network 10 via source router 12. In some cases, the subscriber devices request multicast streams, such as IPTV channels, from source network 10. P2MP LSP 20 established between source network 10 and subscriber devices 18 enables transmission of multicast traffic without running a multicast routing protocol on routers 12, 14, and 16. For example, P2MP LSP 20 may be used for transmission of layer two (L2) multicast traffic, layer three (L3) VPN multicast traffic, or simple Internet Protocol (IP) multicast traffic.

Source router 12, intermediate routers 14, and destination routers 16 maintain routing information that describes available routes through computer network 8. Upon receiving an incoming packet, the routers examine information within the packet and forward the packet in accordance with the routing information. In order to maintain an accurate representation of network 8, the routers exchange routing information, e.g., bandwidth availability of links, in accordance with a defined routing protocol, such as an Interior Gateway Protocol (IGP).

In accordance with principles of the invention, LDP is extended to include label advertisements, a P2MP forwarding equivalence class (FEC) element with an identifier type, and an address of the source router (also referred to as the root node) of the P2MP LSP. The combination of the root node address and the identifier specifies the P2MP LSP. In some cases, there may be several P2MP LSPs rooted at a given root node, each with its own identifier.

In some embodiments, the identifier is treated as an opaque bit string prefix by LDP. The type of the P2MP FEC element is defined such that a router that receives it but does not understand it will simply ignore it, without tearing down the session over which it was received. This may ensure that P2MP LSPs do not impact operation of point to point (P2P) LSPS, and that P2MP LSPS are only set up through nodes that support the necessary extensions.

Further details of the techniques described herein may be found in "Label Distribution Protocol Extensions for Point-to-Multipoint Label Switched Paths," IETF Internet Draft, March 2005, hereby incorporated by reference.

Figure 2:
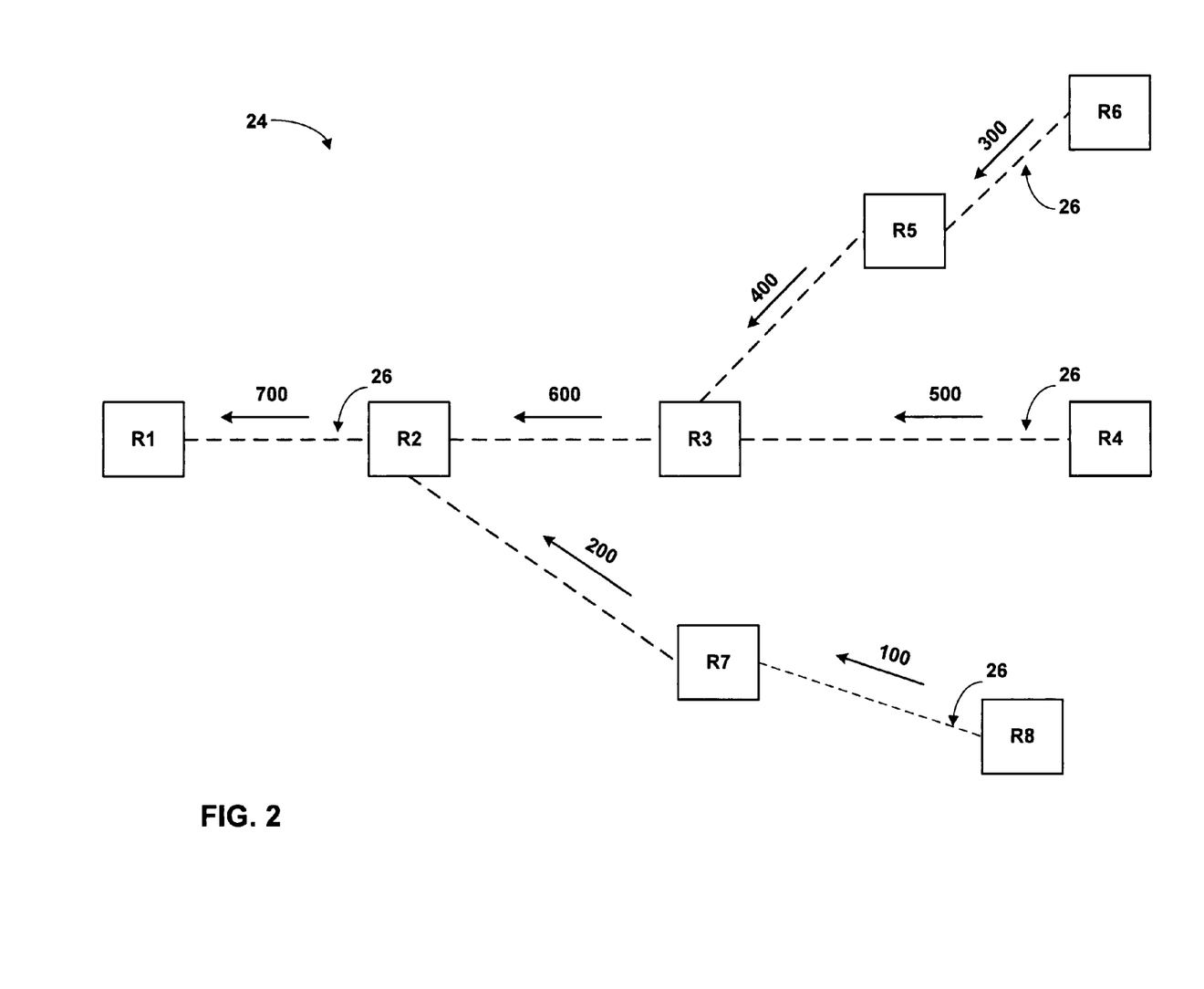
FIG. 2 is a block diagram illustrating an exemplary P2MP LSP operating in an LDP network in accordance with principles of the invention.

FIG. 2 is a block diagram illustrating an exemplary P2MP LSP 26 operating in an LDP network 24 in accordance with principles of the invention. In the example of FIG. 2, network 24 contains eight exemplary label switch routers (LSRs) R1-R8 that run LDP. LSP 26 is a P2MP LSP that extends from a source router R1, also known as an ingress router or "root node," to destination routers R4, R6, and R8, also known as egress routers or "leaf nodes." Routers R2, R3, R5, and R7 are intermediate routers ("branch nodes"), i.e., LSRs with one or more directly connected downstream LSRs. In general, a P2MP LSP has one source LSR, zero or more intermediate LSRs, and one or more destination LSRs.

Destination routers R4, R6, and R8 initiate the setup and teardown of P2MP LSP 26, and propagate labels from the destination routers to source router R1. The root node, R1, installs a forwarding state to map traffic into P2MP LSP 26. In some embodiments, it is assumed that the destination routers R4, R6, and R8 know they are destination routers, and know which router in the network is the root node. In addition, the root node R1 also knows it is the root for the P2MP LSP. Although referred to as the "source" router, the root node R1 may not necessarily be the actual source of the multicast traffic as this may come from a peer network outside network 24.

Destination routers R4, R6, and R8 initiate label messages to set up P2MP LSP 26. For example, R4 first determines the LSR to which it must advertise its label. Unlike conventional LDP mapping, in which label messages are advertised to all neighbor LSRs, R4 uses LDP to determine which LSR lies in the IGP best path to the source router R1 and then advertises label messages only to this LSR. If R4 detects more than one such LSR, only one may be selected to receive the label message advertisements. In the illustrated embodiment, R3 is R4's neighbor that lies on the IGP best path to R1.

Router R4 advertises a label 500 to R3. In addition, R4 also advertises a P2MP label map message having a FEC element that uniquely identifies the LSP. The FEC element, described in further detail below, contains the address of the root of the P2MP LSP (R1) and an opaque identifier. If R3 does not already have a forwarding state for this P2MP FEC element, then the forwarding state is installed in the forwarding table of R3.

Router R3 then sends a P2MP FEC label map message with a label of 600 to R2, after determining that R2 lies on the best path to R1 from the point of view of R3. As above, if R2 does not already have a forwarding state for this P2MP FEC, then the forwarding state is installed in the forwarding table of R2.

Finally, R2 sends a P2MP FEC label map message with a label of 700 to the source router R1.

In the same manner, destination router R6 sends a P2MP FEC label map message with a label of 300 to R5, which in turn sends a P2MP FEC label map message with a label of 400 to R3. Upon receiving this label map message from R5, R3 determines that it already has a forwarding state for this particular FEC. R3 then updates its forwarding table to perform packet replication and sets the forwarding table to again forward the label 600. R3 knows that both R4 and R5 belong to the same P2MP LSP based on the P2MP FECs received from R4 and R5.

Label mappings are similarly propagated from destination router R8 to intermediate router R2 for the same P2MP FEC element. Routers R3 and R2 need not propagate additional labels upon receiving labels from routers R5 and R7, respectively. Routers R3 and R2 are capable of recognizing that routers R5 and R7 belong to a P2MP LSP for which a forwarding state has already been installed. Thus, after a branch node receives and propagates the first label map message, it need not propagate further label map messages for the same P2MP LSP.

The techniques described herein may conserve bandwidth since only a single copy of each packet will be sent on any link traversed by the P2MP LSP with the packet replication performed at the branch nodes. Source router R1 sends a single packet with label 700 to R2, R2 replicates the packet, switches the label to 600 for the packet to R3, and switches the label to 200 for the packet to R7. Similarly, when R3 receives the packet from R2 labeled 600, it replicates the packet, switches the label to 400 on the packet for R5, and switches the label to 500 on the packet for R4. In this manner P2MP LSP 26 transmits multicast traffic across LDP network 24.

In some cases, an LSR of P2MP LSP 26 may withdraw from a multicast group associated with P2MP LSP 26. For example, LSR R8 may propagate a withdrawal message to remove the forwarding state from the other LSRs within P2MP LSP 26. Destination router R8 sends a label withdraw message that specifies the label 100 to its upstream router R7. The propagation of withdrawal information proceeds upstream to the first node where packet replication occurs, in this case R2.

Intermediate router R2 receives the label withdraw message from the downstream router R7, updates its forwarding table to delete the label 200 associated with R7 from its forwarding state, and ceases packet replication. R2 does retain the forwarding state for R3. Intermediate router R2 also sends a label release message to downstream router R7. Although described with respect to downstream allocation of MPLS labels, the techniques may also be used with upstream allocation of MPLS labels.

If deleting the forwarding state for a downstream router results in no state remaining for P2MP LSP 26 within R2, then R2 propagates a label withdraw message to the upstream router, R1, in P2MP LSP 26. The procedure for when a root node of a P2MP LSP receives a label withdraw message is the same as for intermediate nodes, except that no label withdraw message is propagated upstream since the root node has no upstream router in the P2MP LSP.

In the case where an LSR participating in a P2MP LSP discovers that its upstream LSR on the best path to the root node has changed (e.g., from U to U'), the LSR may send a label withdraw message to U containing the label the LSR had previously sent to U for the LSP. The LSR may also delete all forwarding state for the P2MP LSP, allocate a new label for the P2MP LSP, send a label map message advertising the new label for the P2MP LSP to U', and install forwarding state for the new label.

Figure 3:
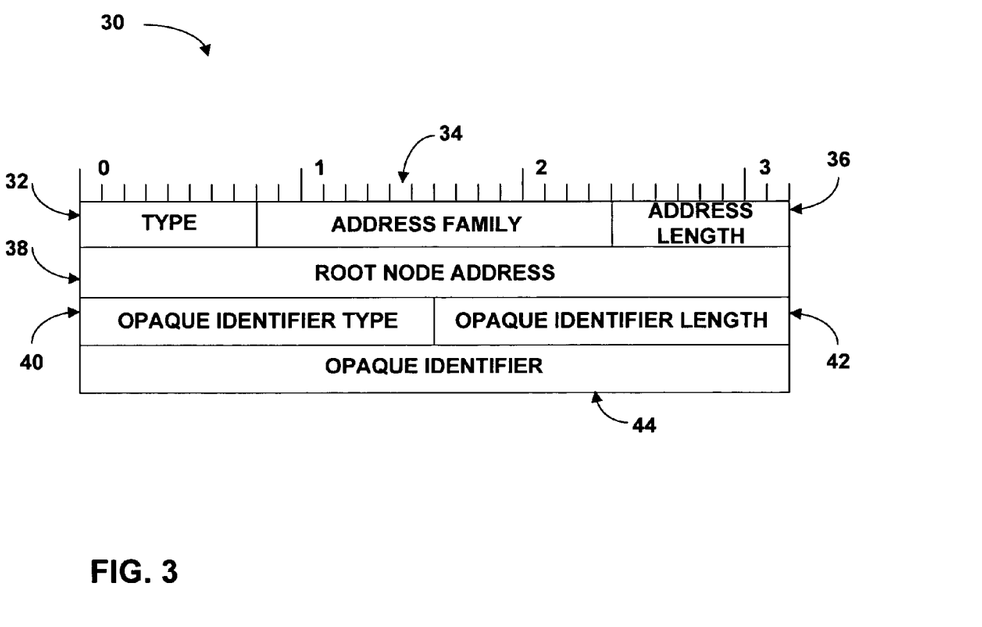
FIG. 3 is a block diagram illustrating an exemplary new label distribution protocol forwarding equivalence class (FEC) element for use in establishing a P2MP LSP.

FIG. 3 is a block diagram illustrating an exemplary new label distribution protocol FEC element 30, referred to as a P2MP FEC element, for use in establishing a P2MP LSP. P2MP FEC element 30 consists of the address of the root of the P2MP LSP and an opaque identifier. The opaque identifier is unique within the context of the root node. The combination of the root LSR address and the opaque identifier uniquely identifies a P2MP LSP within an MPLS network.

P2MP FEC element 30 may be encoded as illustrated in FIG. 3. The type 32 of P2MP FEC element 30 is to be assigned by the Internet Assigned Numbers Authority (IANA). Address family 34 is a two octet quantity containing a value that encodes the address family for the root LSR address. Address length 36 is the length of the root LSR address in octets. Root node address 38 is a host address encoded according to the address family field 34. Opaque identifier type 40 is the type of opaque identifier. Opaque identifier length 42 is the length of the P2MP opaque identifier in octets. Opaque identifier 44 is an opaque identifier of a length in octets as defined by opaque identifier length 42 and padded with zeros so as to be 4-octet aligned.

If address family 34 is Internet Protocol Version Four (IPv4), address length 36 comprises 4. If address family 34 is IPv6, address length 36 comprises 16. Other address lengths may be defined. If address length 36 does not match the defined length for address family 34, the receiving router may abort processing the message containing the FEC element, and send an "Unknown FEC" notification message to the LDP peer signaling an error. If a FEC type-length-value (TLV) contains a P2MP FEC element, the P2MP FEC element may be the only FEC element in the FEC TLV. The encoding scheme for P2MP FEC element as illustrated in FIG. 3 is merely exemplary. Other encoding schemes may be used for encoding the P2MP FEC element.

Figure 4:
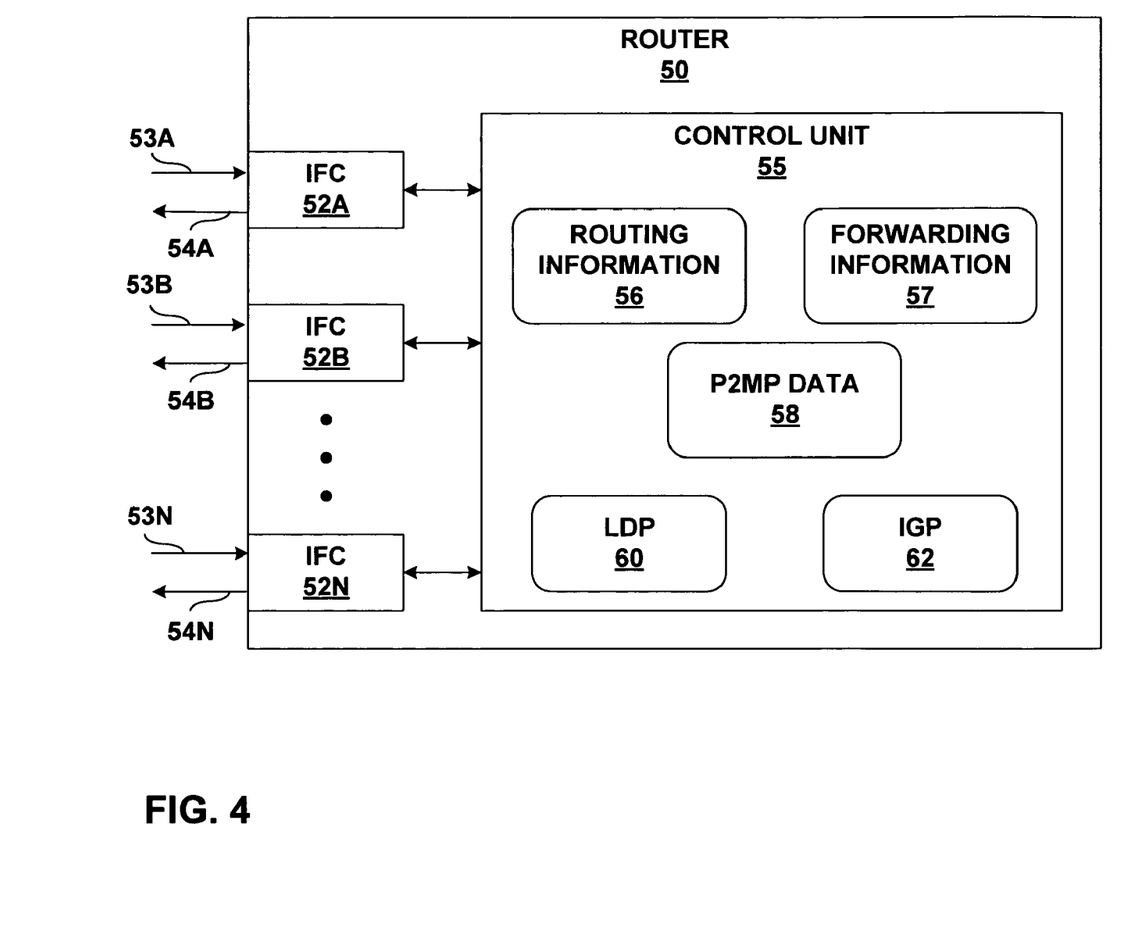
FIG. 4 is a block diagram illustrating an exemplary router that utilizes a protocol that has been extended as described herein.

FIG. 4 is a block diagram illustrating an exemplary router that utilizes a protocol that has been extended as described herein to route traffic associated with a P2MP LSP. Router 50 may, for example, represent any of the routers described herein. As an example, router 50 may comprise an ingress router associated with the P2MP LSP tunnel (i.e., a source network device), an egress router associated with the P2MP LSP tunnel (i.e., a destination network device) or an intermediate network device.

Router 50 includes a set of interface cards (IFCs) 52A-52N ("IFCs 52") for communicating packets via inbound links 53A-53N ("inbound links 53") and outbound links 54A-54N ("outbound links 54"). Router 50 further comprises a control unit 55 that maintains routing information 56. Routing information 56 describes the topology of a network and, in particular, routes through the network. Routing information 56 may include, for example, route data that describes various routes within the network, corresponding next hop data indicating appropriate neighboring devices within the network for each of the routes. Router 50 updates routing information 56 to accurately reflect the topology of the network.

Control unit 55 also maintains forwarding information 57 that associates network destinations with specific next hops and corresponding interface ports. In general, when router 50 receives a multicast packet via one of inbound links 53, Interior Gateway Protocol module 62 ("IGP 62") determines a destination and associated next hop for the packet in accordance with routing information 46 and control unit 55 forwards the packet on one of outbound links 54 to the corresponding next hop based on the destination of the packet.

In the example of FIG. 4, control unit 52 provides an operating environment for a label distribution protocol module 60 ("LDP 60") and IGP 62 executing within control unit 52. In other embodiments, other protocols may be executed within control unit 52, such as the resource reservation protocol (RSVP). LDP 60 has been extended to support P2MP LSPs and the setup techniques described herein. Consistent with the principles of the invention, LDP 60 provides signaling mechanisms for forming a P2MP LSP tunnel. In certain embodiments, the setup operations may be carried out automatically, i.e., without intervention by a system administrator or a software agent.

LDP 60 receives label mappings from other routing devices on inbound links 53, allocates labels, and sends label mappings on outbound links 54. In the event that router 50 comprises a destination router of a desired P2MP LSP, a system administrator or a software agent may invoke LDP 60 to initiate setup of the P2MP LSP through the network. Although described herein for exemplary purposes in reference to LDP, the principles may be applied to extend other protocols, such as other label distribution protocols.

If router 50 receives a P2MP label map message, LDP 60 determines the outbound link 54 on which to send an allocated label by accessing routing information 56 to ascertain the best path as determined by IGP 62. LDP 60 may also consult forwarding information 57 associated with routing information 56 to determine whether router 50 already has a forwarding state for the particular FEC element received in the label map message. If forwarding information 57 already includes the forwarding state, LDP 60 may update forwarding information 57 to do packet replication. Alternatively, forwarding state may be stored in P2MP Data 58 or LDP 60.

LDP 60 maintains P2MP data 58. Depending on the relation of router 50 to the P2MP LSP, P2MP data 58 may store one or more P2MP FEC elements, as described above with respect to P2MP FEC element 30 of FIG. 3. In addition, P2MP data 58 may store one or more labels allocated for the P2MP LSP, the relationships between FEC elements and labels, and the LSRs to which the labels were sent.

The architecture of router 50 illustrated in FIG. 4 is shown for exemplary purposes only. The invention is not limited to this architecture. In other embodiments, router 50 may be configured in a variety of ways. In one embodiment, for example, control unit 55 and its corresponding functionality may be distributed within IFCs 52. In another embodiment, control unit 52 may include a routing engine that performs routing functions and maintains a routing information base (RIB), e.g., routing information 56, and a forwarding engine that performs packet forwarding based on a forwarding information base (FIB), e.g., forwarding information 57, generated in accordance with the RIB.

Control unit 52 may be implemented solely in software, or hardware, or may be implemented as a combination of software, hardware, or firmware. For example, control unit 52 may include one or more processors that execute software instructions. In that case, the various software modules of control unit 52, such as LDP 60 and IGP 62, may comprise executable instructions stored on a computer-readable medium, such as computer memory or hard disk.

Figure 5:
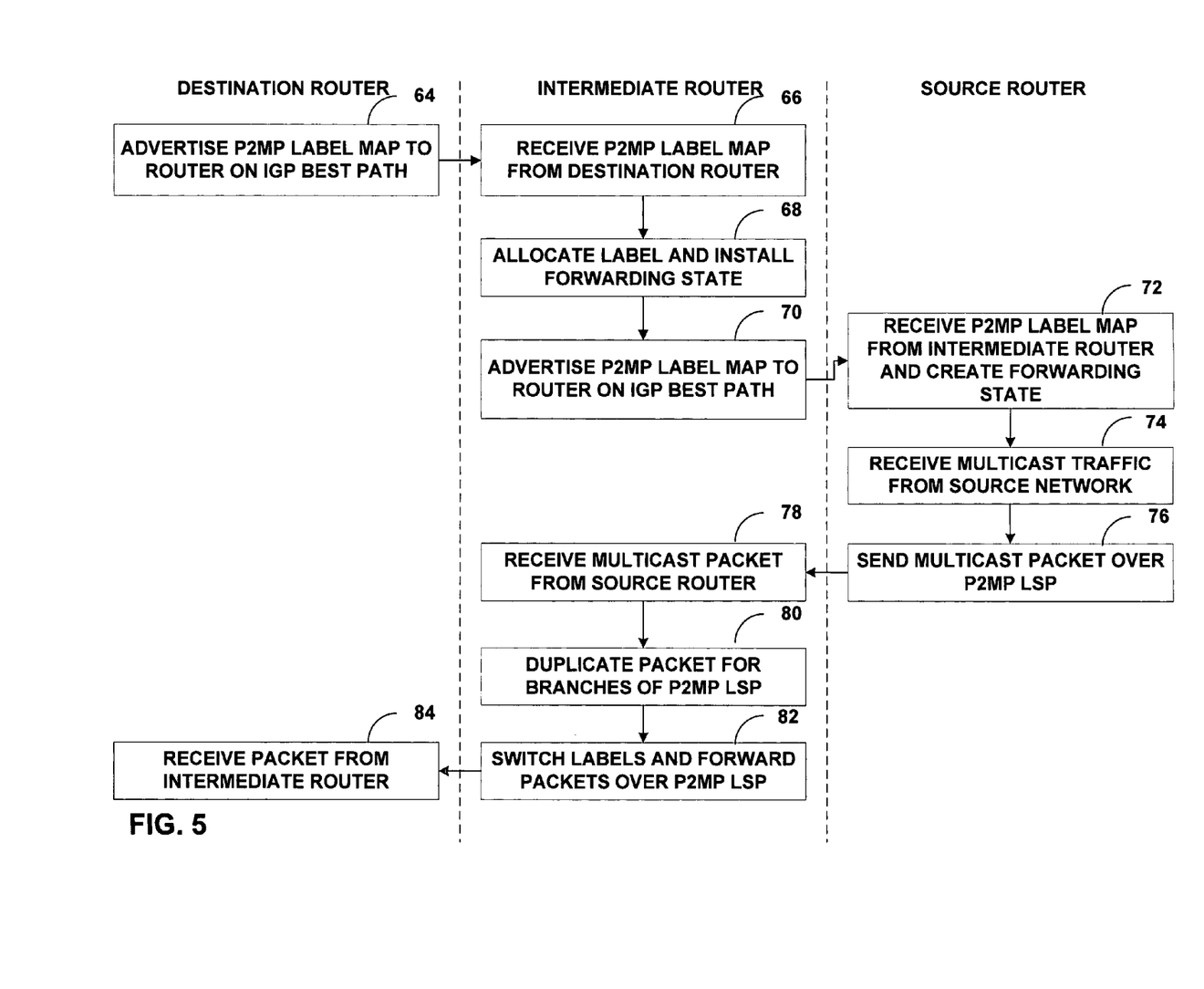
FIG. 5 is a flowchart illustrating exemplary operation of a computer network in establishing a P2MP LSP.

FIG. 5 is a flowchart illustrating exemplary operation of network devices in a computer network establishing a P2MP LSP and transmitting multicast traffic across the established P2MP LSP. The network devices may comprise either a source router of a P2MP LSP, an intermediate router of the P2MP LSP, or one of multiple destination routers of the P2MP LSP. The network devices may be substantially similar to router 50 illustrated in FIG. 4. For exemplary purposes, the process is described relative to network 8 illustrated in FIG. 1.

Network 8 includes P2MP LSP 20 extending from source router 12 to destination routers 16. Destination routers 16 initiate setup of P2MP LSP 20 in network 8. For example, destination router 16B advertises a P2MP label map message to the router determined to be on the IGP best path to source router 12 of P2MP LSP 20, in this case, intermediate router 14B (64). In particular, destination router 16B sends a P2MP label map message of the form (X, Y, L), where L is the label and (X, Y) is a P2MP FEC element with root node address X and opaque identifier Y. The P2MP FEC Element (X, Y) uniquely identifies P2MP LSP 20.

Intermediate router 14B receives the P2MP label map message (X, Y, L) from destination router 16B (66) over an interface I. If intermediate router 14B already has a forwarding state installed for this particular P2MP FEC element (X, Y), then router 14B updates its forwarding table to perform packet replication and adds "swap L, send over interface I" to the next hop. In this case, 14B does not advertise a label map message. If intermediate router 14B does not already have a forwarding state for this P2MP FEC element, then router 14B allocates a label L' and installs the forwarding state in its forwarding table to swap L' with L (68). In this case, intermediate router 14B determines the upstream router on the IGP best path to source router 12 and advertises to the upstream router a P2MP label map message (X, Y, L') containing the allocated label and the P2MP FEC element (X, Y) (70).

Source router 12 receives the P2MP label map message (X, Y, L') from intermediate router 14B and determines whether it already has forwarding state for (X, Y) (72). If not, source router 12 creates the forwarding state to push label L' onto the traffic that source router 12 forwards over P2MP LSP 20. A similar process of label propagation takes place from destination routers 16A and 16C to set up the other branches of P2MP LSP 20.

Source router 12 receives multicast traffic from source network 10 (74). Source router 12 then forwards the multicast packet according to its forwarding table. Specifically, source router 12 forwards the multicast packet on P2MP LSP 20 (76). Source router 12 pushes a forwarding label onto the packet that identifies the next hop along P2MP LSP 20.

The packet is transmitted to one of intermediate routers 14A and 14B based on the label affixed to the packet. Intermediate router 14B, for example, receives the packet from source router 12 (78). Intermediate router 14B duplicates the packet to make a copy for each of the branches of P2MP LSP 20 for which it has a next hop in its forwarding table (80). Intermediate router 14B then switches the labels and forwards a copy of the packet on each of the branches of P2MP LSP 20 (82). Intermediate router 14B pushes a forwarding label onto the first copy of the packet that identifies the next hop as destination router 16B. Intermediate router 14B also pushes a forwarding label onto the second copy of the packet that identifies the next hop as intermediate router 14C. Destination router 16B receives the packet from intermediate router 14B (84).

Figure 6:
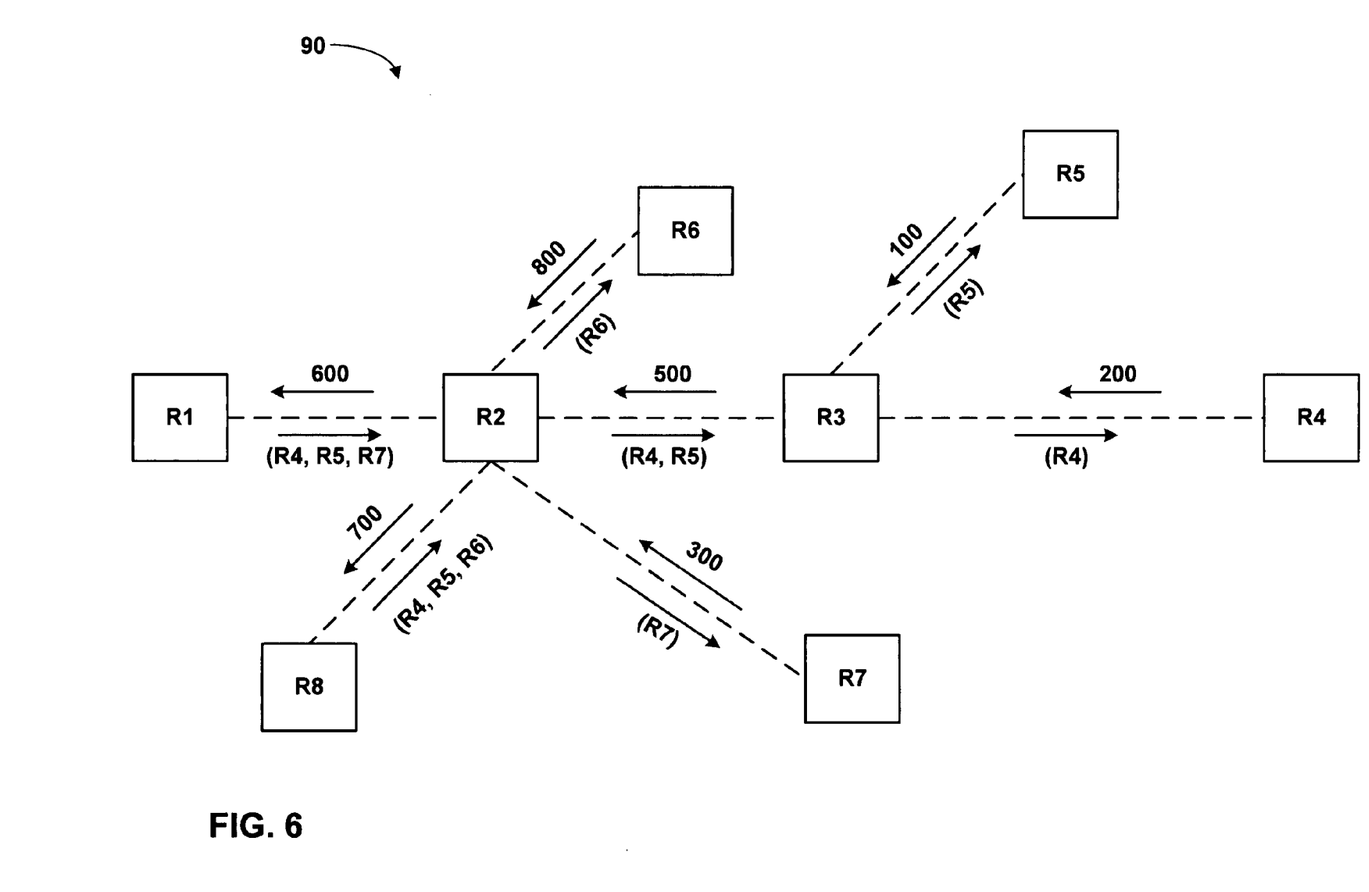
FIG. 6 is a block diagram illustrating an exemplary alternative embodiment of a computer network having P2MP LSPs.

FIG. 6 is a block diagram illustrating an exemplary alternative embodiment of a computer network 90 using a protocol, such as LDP, extended to support P2MP LSPs. In the example of FIG. 6, several distinct P2MP LSPs exist, but state information of the P2MP LSPs is shared by intermediate routers in network 90. This is in contrast to the embodiments described in FIG. 2, where there is separate state information for each P2MP FEC element (X, Y). In this embodiment, encoding of the P2MP FEC elements may differ from the encoding described above with respect to FIG. 3.

In this embodiment, the initiators of the P2MP LSP setup process are the source routers, not the destination routers. As illustrated in FIG. 6, computer network 90 has eight exemplary routers R1-R8, which are different routers than in FIG. 2. Routers R1 and R8 are source routers, routers R4, R5, R6, and R7 are destination routers, and routers R2 and R3 are intermediate routers. It is assumed that the source routers R1 and R8 know which routers in network 90 are the destination routers. For example, if P2MP is to be used in a Virtual Private Network (VPN) setup, the source router will typically know to which destination routers to send traffic based on routing protocol advertisements.

The embodiment of FIG. 6 is a request/reply scheme in which routers provide labels on demand. For example, suppose source router R1 wants to set up a P2MP LSP to destination routers R4, R5, and R7. Source router R1 sends a label request to the router that lies on the IGP best path to these destination routers, in this case intermediate router R2. Intermediate router R2 receives the request for a label from R1. The request asks for the labels for destination routers R4, R5, and R7. However, intermediate router R2 does not necessarily know the labels for each of these destination routers. If router R2 does not know the labels, R2 sends a request for the labels to the router that lies on the IGP best path to the destination routers.

Intermediate router R2 is directly connected to R7, so R2 sends a request for the R7 label to router R7 and receives a reply from R7 identifying its label as 300. Intermediate router R2 also sends a request to intermediate router R3 for the labels of R4 and R5. Destination router R4 sends a reply identifying its label as 200, and R5 sends a reply identifying its label as 100. R3 replies to R2 identifying the R3 label as 500, and R2 replies to R1 identifying the R2 label as 600. Intermediate router R2 may send this label reply immediately after receiving the request for label mapping from R1, or R2 may wait until it receives replies from the destination routers before sending the label reply.

Suppose that source router R8 wants to set up a separate P2MP LSP to destination routers R4, R5, and R6. Source router R8 sends a label request to the router that lies on the IGP best path to these destination routers, in this case, intermediate router R2. Intermediate router R2 receives the request for a label from R8. The request asks for the labels for destination routers R4, R5, and R6.

Intermediate router R2 already has a label for the (R4, R5) portion of the request, based on the requests from R1 in setting up the first P2MP LSP. Intermediate router R2 shares the label between the first P2MP LSP and the second P2MP LSP by re-using the label 500 previously set up for the first P2MP LSP. Intermediate router R2 is directly connected to R6, so R2 sends a request for the R6 label to router R6 and receives a reply from R6 identifying its label as 800. Intermediate router R2 replies to source router R8 with the label 700. Intermediate router R2 may send this label reply immediately after receiving the request for label mapping from R8, or R2 may wait until it receives replies from the destination routers before sending the label reply.

In the illustrated embodiments, two separate P2MP LSPs are set up across network 90. The first has source router R1 and destination routers R4, R5, and R7, and the second has source router R8 and destination routers R4, R5, and R6. The P2MP LSPs are set up such that intermediate router R2 shares labels between the two P2MP LSPs. This may result in less state information being stored in the core of the network, which may help with state preservation.

According to the forwarding tables of intermediate router R2, if R2 receives a multicast packet with label 600, R2 swaps the label with 500 if the packet is to R3, and with 300 if the packet is to R7. If R2 receives a multicast packet with label 700, it swaps the label with 500 if the packet is to R3, and with 800 if the packet is to R6.

Various embodiments of the invention have been described. These and other embodiments are within the scope of the following claims.

The invention claimed is:

1. A method comprising:
   generating a label distribution protocol message that includes both a label associated with a point to multi-point (P2MP) label switched path (LSP) and a forwarding equivalence class (FEC) element that identifies the P2MP LSP;
   communicating the message in accordance with the label distribution protocol to a routing device;
   receiving a withdraw message from a downstream routing device on a downstream branch of the P2MP LSP;
   determining whether an additional downstream branch of the P2MP LSP exists, and
   propagating the withdraw message to an upstream routing device in the P2MP LSP when no additional downstream branch of the P2MP LSP exists.

2. The method of claim 1, wherein generating the label distribution message comprises generating a map message to specify the label associated with the P2MP LSP.

3. The method of claim 1, wherein generating the label distribution message comprises generating a withdraw message to withdraw the label associated with the P2MP LSP.

4. The method of claim 1, further comprising using a routing protocol to select the routing device along a best path to a source device associated with the P2MP LSP, wherein communicating the message comprises communicating the message to the selected routing device.

5. The method of claim 1, wherein the FEC element contains an address of a source device of the P2MP LSP and an identifier that identifies the P2MP LSP.

6. The method of claim 5, wherein the identifier is an opaque identifier.

7. The method of claim 1, further comprising:
   transporting multicast traffic via the P2MP LSP; and
   duplicating the multicast traffic at an intermediate device associated with the P2MP LSP when two or more branches of the P2MP LSP originate at the intermediate device.

8. The method of claim 1, wherein communicating the message comprises communicating the message over a Multi-protocol Label Switching (MPLS) network.

9. The method of claim 1, further comprising:
   establishing the P2MP LSP having a source device and multiple destination devices within a computer network; and
   mapping packets received on an incoming link of the source device associated with the P2MP LSP to at least one destination device in accordance with the label distribution protocol.

10. A method comprising:
    receiving a first request for labels for a plurality of destination devices associated with a first point to multi-point (P2MP) label switched path (LSP);
    receiving first labels for the plurality of destination devices associated with the first P2MP LSP;
    receiving a second request for labels for a plurality of destination devices associated with a second P2MP LSP;

determining whether a destination device associated with the first P2MP LSP is one of the plurality of destination devices associated with a second P2MP LSP; and when the destination device associated with the first P2MP LSP is one of the plurality of destination devices associated with a second P2MP LSP:

sharing, between the first P2MP LSP and second P2MP LSP, one of the first labels for the plurality of destination devices associated with the first P2MP LSP; and sending a request for labels for an additional one or more destination devices associated with the second P2MP LSP.

11. The method of claim 10, wherein the first P2MP LSP is associated with a first source device, and wherein the second P2MP LSP is associated with a second source device.

12. A system comprising:
a first source device;
a second source device;
an intermediate device;
a plurality of destination devices associated with a first point to multi-point (P2MP) label switched path (LSP), wherein the first P2MP LSP connects the first source device to the intermediate device and the one or more destination devices associated with the first P2MP LSP; and
a plurality of destination devices associated with a second point to multi-point (P2MP) label switched path (LSP), wherein the second P2MP LSP connects the second source device to the intermediate device and the one or more destination devices associated with the second P2MP LSP,
wherein the intermediate device shares a same label for a first destination device associated with both the first and second P2MP LSPs, and requests an additional label for a second destination device associated with the first P2MP LSP.

13. A computer-readable storage medium comprising instructions stored thereon for causing a programmable processor to:

generate a label distribution protocol message that includes both a label associated with a point to multi-point (P2MP) label switched path (LSP) and a forwarding equivalence class (FEC) element that identifies the P2MP LSP; and communicate the message in accordance with the label distribution protocol to a routing device receive a withdraw message from a downstream routing device on a downstream branch of the P2MP LSP, determine whether an additional downstream branch of the P2MP LSP exists; and propagate the withdraw message to an upstream routing device in the P2MP LSP when no additional downstream branch of the P2MP LSP exists.

* * * * *